US010834452B2

(12) United States Patent
Tillette de Clermont-Tonnerre et al.

(10) Patent No.: US 10,834,452 B2
(45) Date of Patent: Nov. 10, 2020

(54) DYNAMIC LIVE FEED RECOMMENDATION ON THE BASIS OF USER REAL TIME REACTION TO A LIVE FEED

(71) Applicant: International Business Machines Corporation, Armonk, NY (US)

(72) Inventors: Laurent Tillette de Clermont-Tonnerre, San Francisco, CA (US); Mark Delaney, Raleigh, NC (US); Robert H. Grant, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 16/238,391

(22) Filed: Jan. 2, 2019

(65) Prior Publication Data

US 2020/0213649 A1  Jul. 2, 2020

(51) Int. Cl.
*H04N 7/16* (2011.01)
*H04H 60/33* (2008.01)
*H04N 21/2668* (2011.01)
*G06K 9/00* (2006.01)
*H04N 21/2187* (2011.01)
*H04N 21/442* (2011.01)
*H04N 21/258* (2011.01)
*H04N 21/845* (2011.01)

(52) U.S. Cl.
CPC ..... *H04N 21/2668* (2013.01); *G06K 9/00335* (2013.01); *H04N 21/2187* (2013.01); *H04N 21/25891* (2013.01); *H04N 21/44218* (2013.01); *H04N 21/8456* (2013.01)

(58) Field of Classification Search
CPC ....... H04N 21/21887; H04N 21/25891; H04N 21/2668; H04N 21/44218
See application file for complete search history.

(56) References Cited

U.S. PATENT DOCUMENTS 5,676,138 A 10/1997 Zawilinski
9,204,098 B1 12/2015 Cunico et al.
9,503,786 B2 11/2016 de Kaliouby et al.
(Continued)

OTHER PUBLICATIONS

"List of IBM Patents or Patent Applications Treated as Related," Letter from Leslie A. Van Leeuwen, Jun. 28, 2019, 1 page.
(Continued)

*Primary Examiner* — Gigi L Dubasky
(74) *Attorney, Agent, or Firm* — VanLeeuwen & VanLeeuwen; Alexander G. Jochym

(57) ABSTRACT

An approach is provided that provides a dynamic live feed recommendation to a user on the basis of the user's real-time reaction to a live feed content. A video is transmitted to a user's display device with the video including a number of tagged segments. Multimedia response data is received from the user's display device of the user watching the content. A degree of user engagement is determined based on the received multimedia response data corresponding to the content segments. When user engagement falls below a threshold, then alternative content options are identified based on the determined degree of user engagement and these alternative content options are transmitted to the user display device for display in an area proximate to the display of the video content.

11 Claims, 7 Drawing Sheets

(56) References Cited

U.S. PATENT DOCUMENTS

| | | | |
|---|---|---|---|
| 9,652,676 B1 | 5/2017 | Dey et al. | |
| 2012/0076357 A1* | 3/2012 | Yamamoto | H04N 21/233 |
| | | | 382/103 |
| 2012/0222057 A1* | 8/2012 | Sadowsky | H04N 21/251 |
| | | | 725/10 |
| 2012/0259240 A1* | 10/2012 | Llewellynn | G06Q 30/02 |
| | | | 600/558 |
| 2014/0236673 A1* | 8/2014 | Smith | G06Q 50/01 |
| | | | 705/7.29 |
| 2015/0281783 A1* | 10/2015 | Laksono | H04N 21/4415 |
| | | | 725/10 |
| 2016/0042226 A1 | 2/2016 | Cunico et al. | |
| 2016/0219119 A1* | 7/2016 | Yu | H04L 67/22 |
| 2017/0134803 A1* | 5/2017 | Shaw | H04N 21/42203 |
| 2017/0352351 A1* | 12/2017 | Kimura | G10L 25/78 |
| 2018/0014037 A1 | 1/2018 | Venkatraman et al. | |
| 2019/0286673 A1* | 9/2019 | Sayyadi-Harikandehei | |
| | | | H04N 21/231 |

OTHER PUBLICATIONS

Tillette De Clermont-Tonnerre et al., "Dynamic Live Feed Recommendation on the Basis of User Real Time Reaction to a Live Feed," U.S. Appl. No. 16/456,182, 34 pages.

Fissell, "How to Analyze & Manage Viewer Sentiment for Online Video Marketing," Share On, Oct. 2012, 11 pages.

"Text Analysis of YouTube Comments," CuriousGnu, Youtube, Feb. 2017, 7 pages.

"YouTube Analysis—Understanding Video Sentiment," Pagezii Marketing, 2018, 7 pages.

* cited by examiner

DYNAMIC LIVE FEED RECOMMENDATION ON THE BASIS OF USER REAL TIME REACTION TO A LIVE FEED

BACKGROUND OF THE INVENTION

Description of Related Art

With the advent of live video, many users are using live streams for entertainment, news, security, and other topics. Traditional system utilize historical user profiles to identify user preferences and to suggest additional content to users.

SUMMARY

An approach is provided that provides a dynamic live feed recommendation to a user on the basis of the user's real-time reaction to a live feed content. A video is transmitted to a user's display device with the video including a number of tagged segments. Multimedia response data is received from the user's display device of the user watching the content. A degree of user engagement is determined based on the received multimedia response data corresponding to the content segments. When user engagement falls below a threshold, then alternative content options are identified based on the determined degree of user engagement and these alternative content options are transmitted to the user display device for display in an area proximate to the display of the video content.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
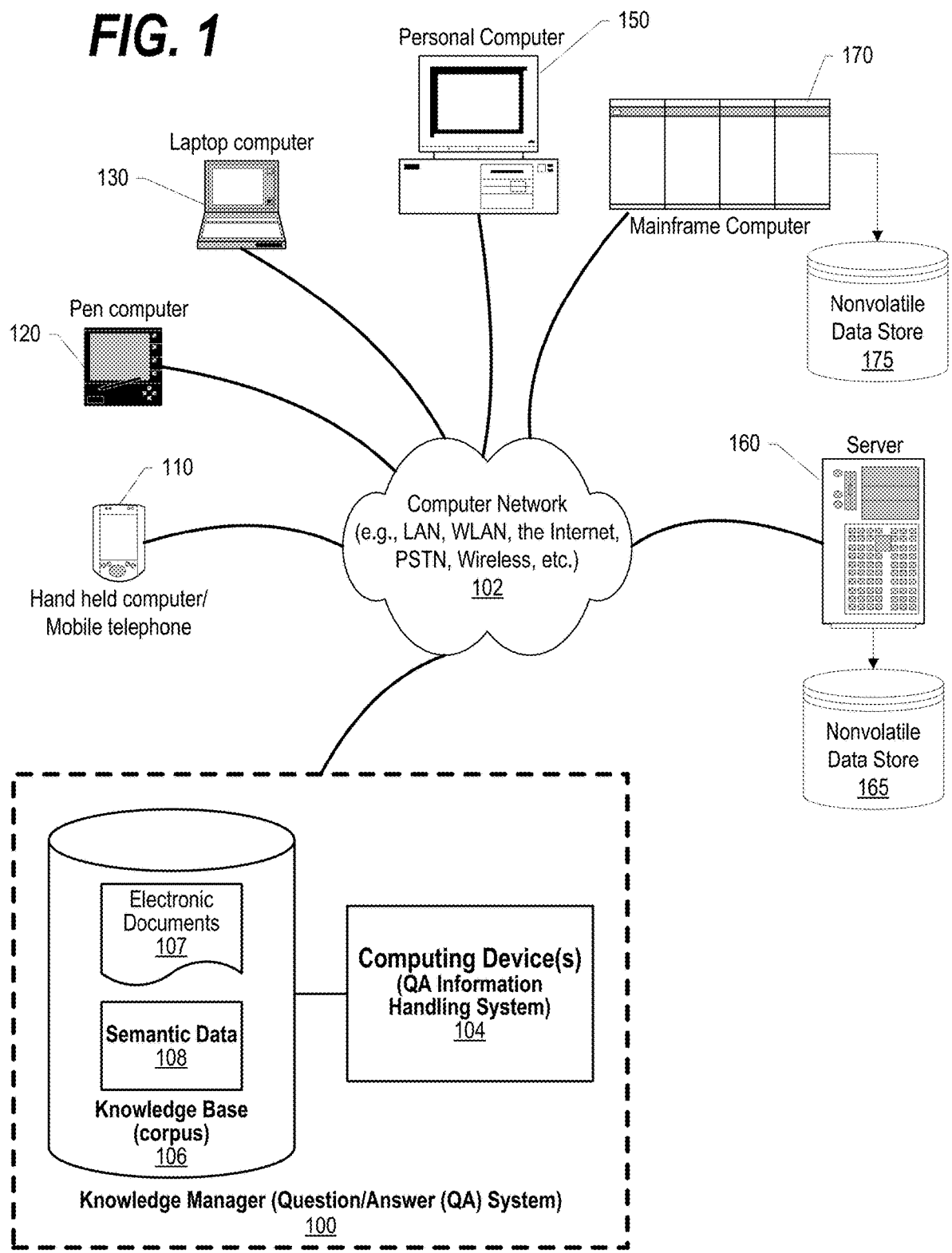
FIG. 1 depicts a network environment that includes a knowledge manager that utilizes a knowledge base.

FIGS. 1-7 describe an approach that provides a dynamic live feed recommendation to a user on the basis of the user's real-time reaction to a live feed content. By using historical profiles, traditional systems have little or no way of identifying a current mood of a user so such traditional systems might suggest a program with news content when the user is actually in the mood to view a lighthearted comedy. This approach captures and identifies a user's real time reactions and emotions to video content and automatically recommends alternative content based on such reactions and emotions. The approach captures the user's emotion based on the feelings that the user expresses triggering a response to watch additional or alternative content. The approach utilizes analysis of a user's spontaneous vocal tones, facial expressions, eye and body movements, and other verbal and non-verbal cues to dynamically adjust suggested alternative content in near real-time with suggested content being either other live feed content or previously recorded content.

Content is generated with tags corresponding to portions of the media providing metadata of the content that can be scanned at a frame-by-frame level in near real time. Content metadata includes an index of the frames in the content. Current "iframes" technology can be used to scan images with traditional image recognition technology to identify the type of content being exhibited in various frames of the content. In addition to the level of user attention, the approach can also discriminate between positive and negative reactions so that the suggested alternative content can be ranked accordingly. The approach leverages the user's past history of emotions and reactions along with previously selected alternative content to measure the level of interest and relevance to the emotions and reactions currently being captured from the user.

Furthermore, the approach can adapt to the way the user wishes to view suggestions based on the level of emotional reaction. For example, if the cognitive APIs utilized by the approach identify a user's response as decreasing in intensity, the approach could move the alternative content suggestions from the side of the screen to a more prominent position on the screen, such as is a pop-up window, in order to better capture the user's attention before the user's attention level decreases even further. By identifying alternative content or topics, the user's attention level might be revived or increased.

The example below provides one scenario in which the approach described herein could be beneficially utilized. (1) a user is watching a live stream on a media platform; (2) the user has enabled to share the user's webcam and microphone with the platform in order to receive alternative content suggestions; (3) the user is captivated by a current video stream exhibited by not only keeping his eyes focused on the screen but also by producing facial expressions exhibiting his excitement or enjoyment and otherwise positive response to the video stream; (4) the video stream is tagged by the content provider to indicate to the system metadata regarding the content being provided during the current segment of the video stream; (5) the video platform content provider captures the webcam stream and the verbal responses from the user's system; (6) the user's non-verbal and verbal responses are processed by cognitive APIs to extract and classify the user's reactions and intensity of the reactions measuring both the interest as well as whether the reaction is negative or positive; (7) the content provider correlates the response from the user with the live tags of the current video segment in order to identify similar content (live or recorded); (8) the content provider displays content suggestions on a more inconspicuous area of the user's display, such as along the bottom or on one side; (9) the content provider then detects a decrease in the user's interest or attention, for example the user expressing less positive emotions and more negative emotions, looking away from the comment, commenting negatively about the content, etc.; (10) the content provider utilizes stronger visual signals to direct the user's attention to alternate content suggestions, such as by using a different font size or color to highlight one or more content suggestions; (11) the content provider anticipates using predictive models that the user is likely or about to leave the content platform with the provider further highlighting alternative content such as by displaying one or more alternative content suggestions in a pop-up window; and (12) the user selects one of the alternative content suggestions and the selected content (either live or previously recorded) is displayed to the user at the user's display device.

Inventive Advantages

The inventors have discovered a system that provides significant advantages over prior art systems. The inventors' system improves delivery of content to users and therefore improves content delivery computer systems by using less computing resources to provide desired content to users. This reduction in computing resources also has the inventive advantage of reducing network demands by delivering less undesirable content to users over existing computer networks, such as the Internet. The system also works to improve the user's computing systems that deliver the content to users by having to use less time and, therefore, fewer computing resources of the inventor's content delivery computing systems.

Terminology and Scope

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer creation (QA) system 100 in a computer network 102. QA system 100 may include a knowledge manager computing device 104 (comprising one or more processors and one or more memories, and potentially any other computing device elements generally known in the art including buses, storage devices, communication interfaces, and the like) that connects QA system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments of QA system 100 may be used with components, systems, sub-systems, and/or devices other than those that are depicted herein.

QA system 100 may be configured to receive inputs from various sources. For example, QA system 100 may receive input from the network 102, a corpus of electronic documents 107 or other data, a content creator, content users, and other possible sources of input. In one embodiment, some or all of the inputs to QA system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with QA system 100. Electronic documents 107 may include any file, text, article, or source of data for use in QA system 100. Content users may access QA system 100 via a network connection or an Internet connection to the network 102, and may input questions to QA system 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. Semantic data 108 is stored as part of the knowledge base 106. In one embodiment, the process sends well-formed questions (e.g., natural language questions, etc.) to the knowledge manager. QA system 100 may interpret the question and provide a response to the content user containing one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
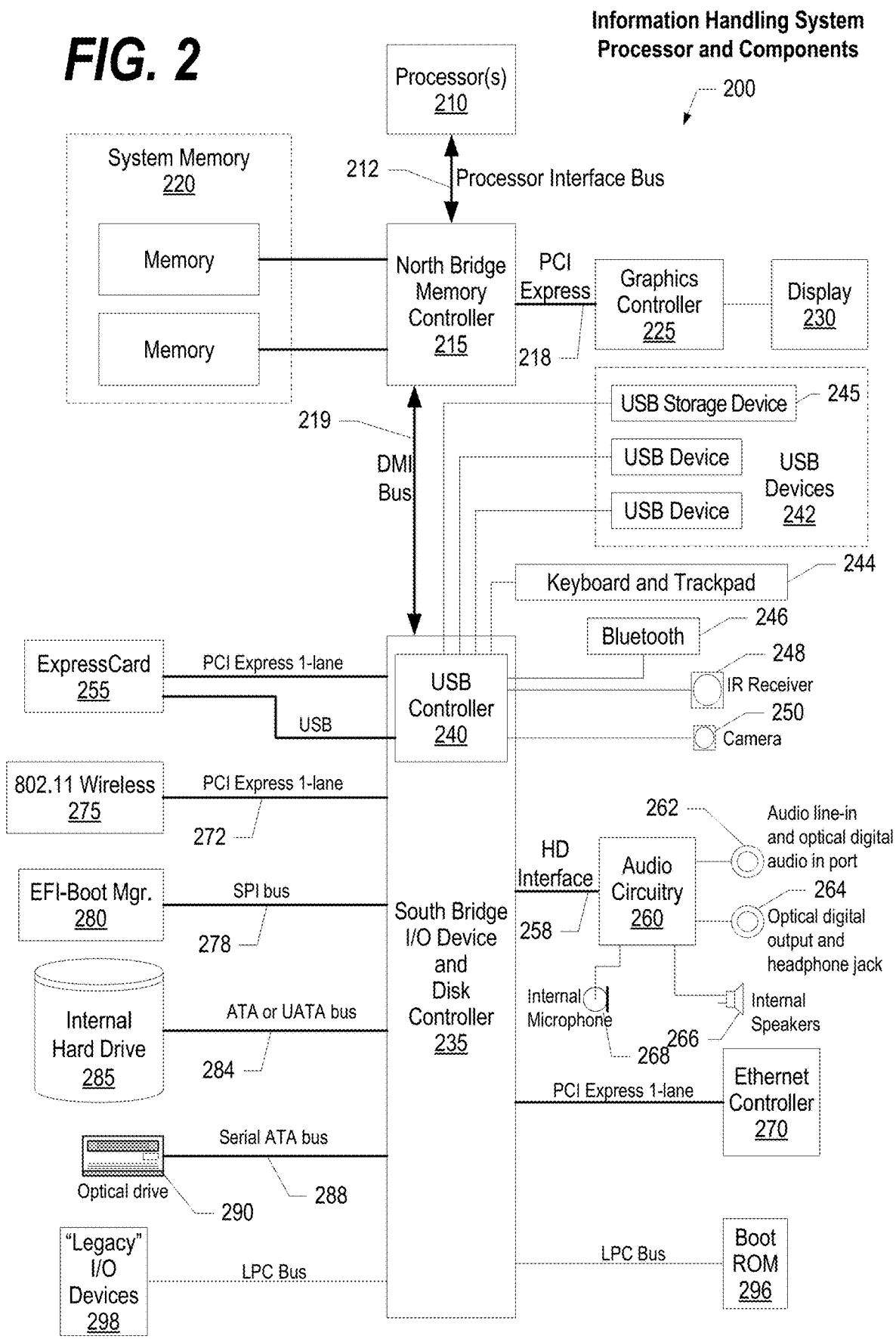
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE .802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
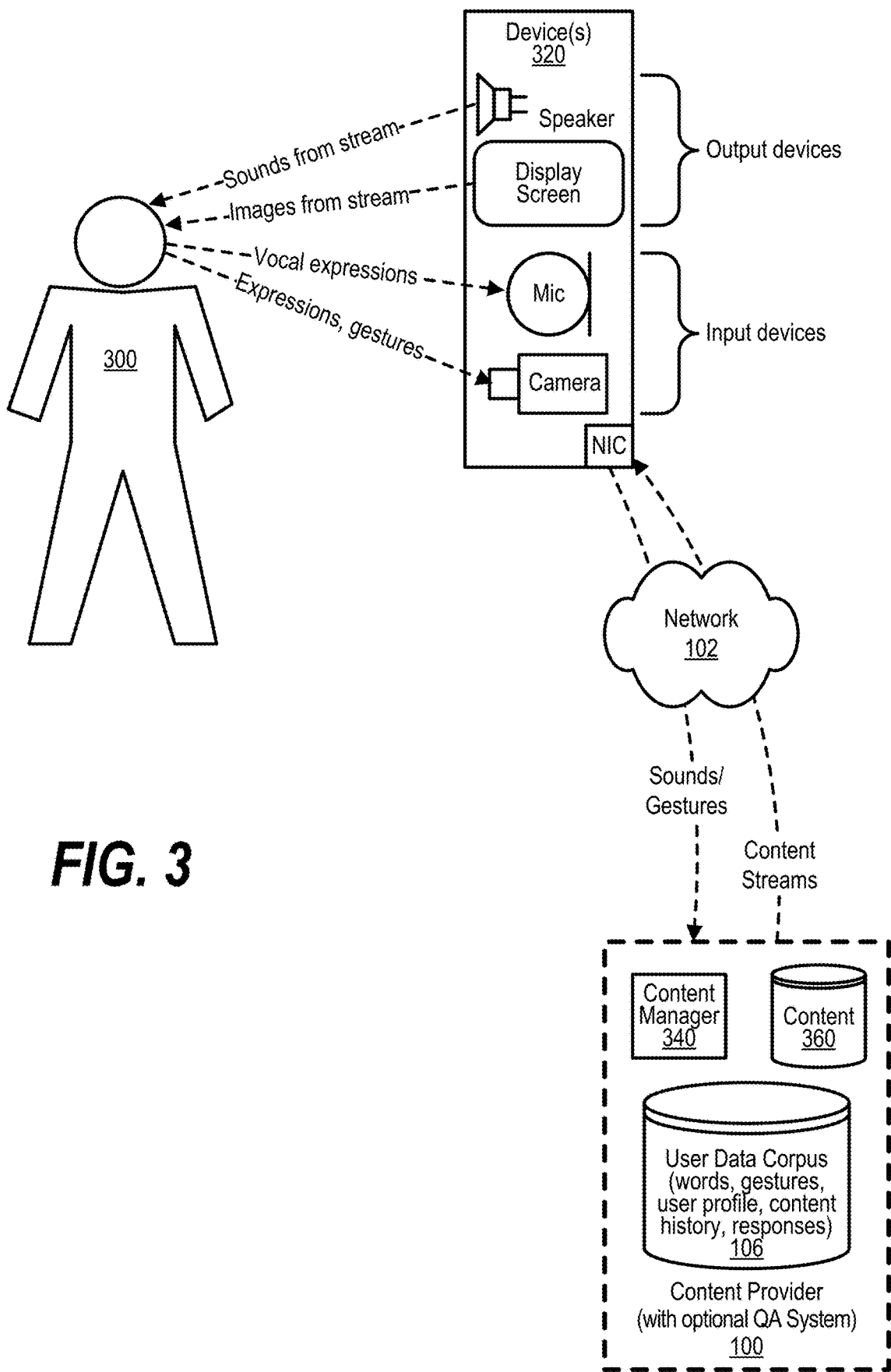
FIG. 3 is a component diagram that provides a dynamic live feed recommendation to a user on the basis of the user's real-time reaction to a live feed content.

FIG. 3 is a component diagram that provides a dynamic live feed recommendation to a user on the basis of the user's real-time reaction to a live feed content. User 300 utilizes user's display device 320 to which content provider 100 transmits content 360 that is received and viewed at user's device 320. The content includes a segments that correspond to one or more metadata tags that describe the segments (e.g., type of action/material in the segment, etc.). Multimedia response data is gathered by microphone (vocalizations from user 300) and digital camera (non-verbal body language communications from user 300). The multimedia response data is related to audio and video captured of a user while the user watched a selected one or more of the plurality of content segments.

Content manager 340 runs a process that determines a degree of user engagement pertaining to each of the content segments. The determined degree of user engagement is based on the received multimedia response data that corresponds to the selected content segments. In one embodiment, when the determined degree of user engagement falls below a user engagement threshold level, then content manager utilizes corpus 106 to gather alternative content options that are based on the determined degree of user engagement with the selected content segments. Content provider 100 transmits the alternative content options to user display device 320 so that the alternative content options are displayed on the display device of the device in an area of the display that is proximate to displayed video content.

Figure 4:
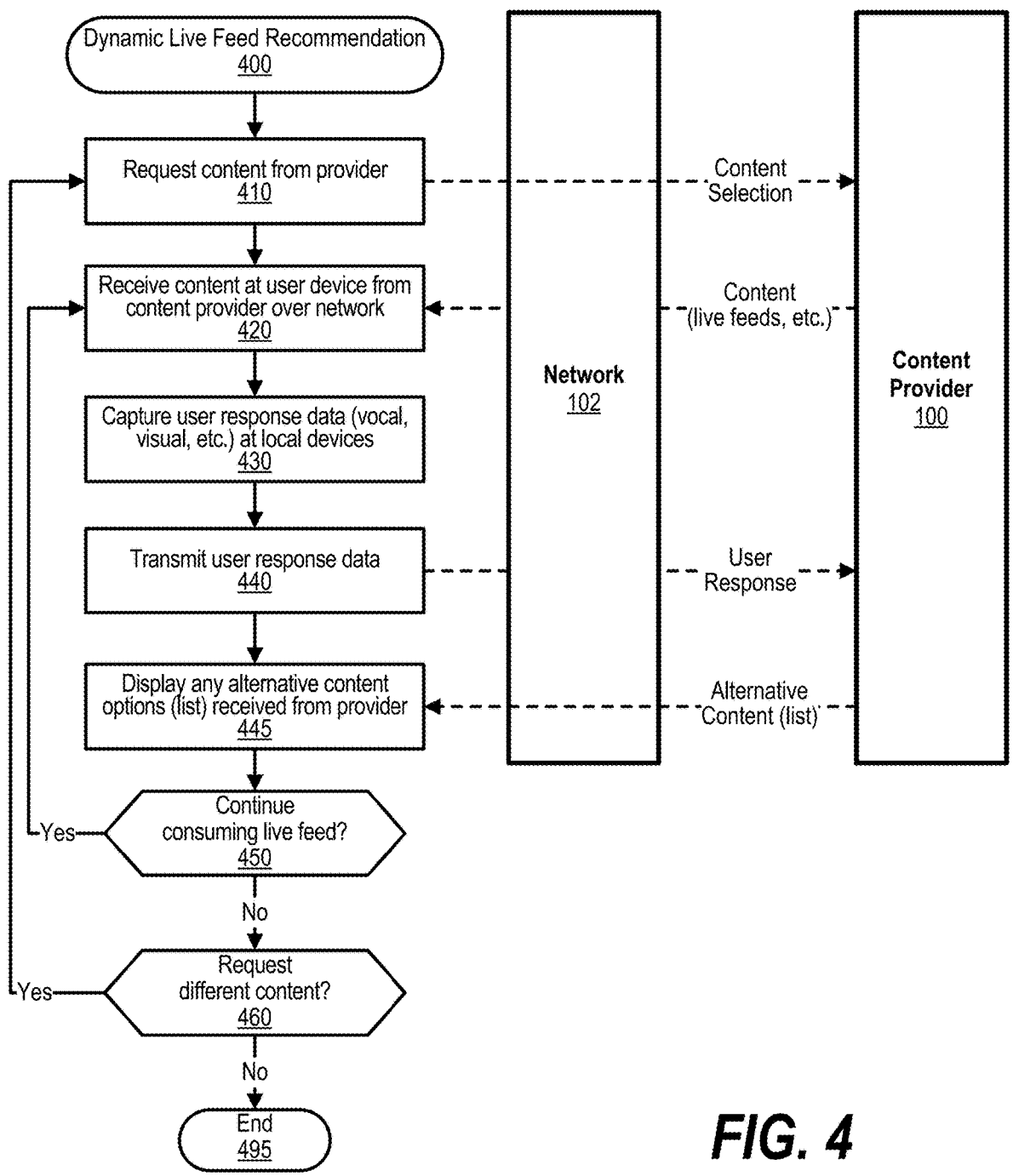
FIG. 4 is a depiction of a flowchart showing the logic used to provide a dynamic live feed recommendation to a user on the basis of the user's real-time reaction to a live feed content.

FIG. 4 is a depiction of a flowchart showing the logic used to provide a dynamic live feed recommendation to a user on the basis of the user's real-time reaction to a live feed content. FIG. 4 processing commences at 400 and shows the steps taken by a process that performs dynamic live feed recommendation at the user's display device. At step 410, the process running on the user's display device requests content from provider 100 via network 102. At step 420, the process running on the user's display device receives a streaming transmission of content at user device from content provider over network and the content is displayed at the user's display device. At step 430, the process running on the user's display device captures user multimedia response data that includes both vocalizations by the user (e.g., "great!", "ugh, this is terrible!", etc.) and non-verbal body language communications at local devices, such as a microphone and digital camera accessible from the user's display device.

At step 440, the process running on the user's display device transmits the user multimedia response data back to provider 100. During streaming of the first video content, the user can select one of the other alternative content options transmitted from content provider 100 and displayed on an area of the user's display screen at step 445. The list of alternative content transmitted to the user is based on the user's multimedia response data that was transmitted to and processed by the content provider.

The process running on the user's display device determines as to whether the user wishes to continue consuming live feed of the content from the content provider (decision 450). If the user continues consuming the live feed, then decision 450 branches to the 'yes' branch which loops back to step 420 to continue receiving and displaying the first video content. While the selected video is playing, the content provider may transmit alternative content options that are displayed on the user's display screen. During streaming of the first video content, the user can select one of the other alternative content options. The looping of decision 450 continues until the user either selects a different content option or quits watching content altogether, at which point decision 450 branches to the 'no' branch exiting the loop.

The process determines as to whether the user has requested a different content option from the list of alternative content options provided by the provider (decision 460). If the user has requested a different content option, then decision 460 branches to the 'yes' branch which loops back to step 410 to request the selected alternative content option from provider 100. This looping continues until the user stops watching online content from the provider altogether, at which point decision 460 branches to the 'no' branch exiting the loop and processing ends at 495.

Figure 5:
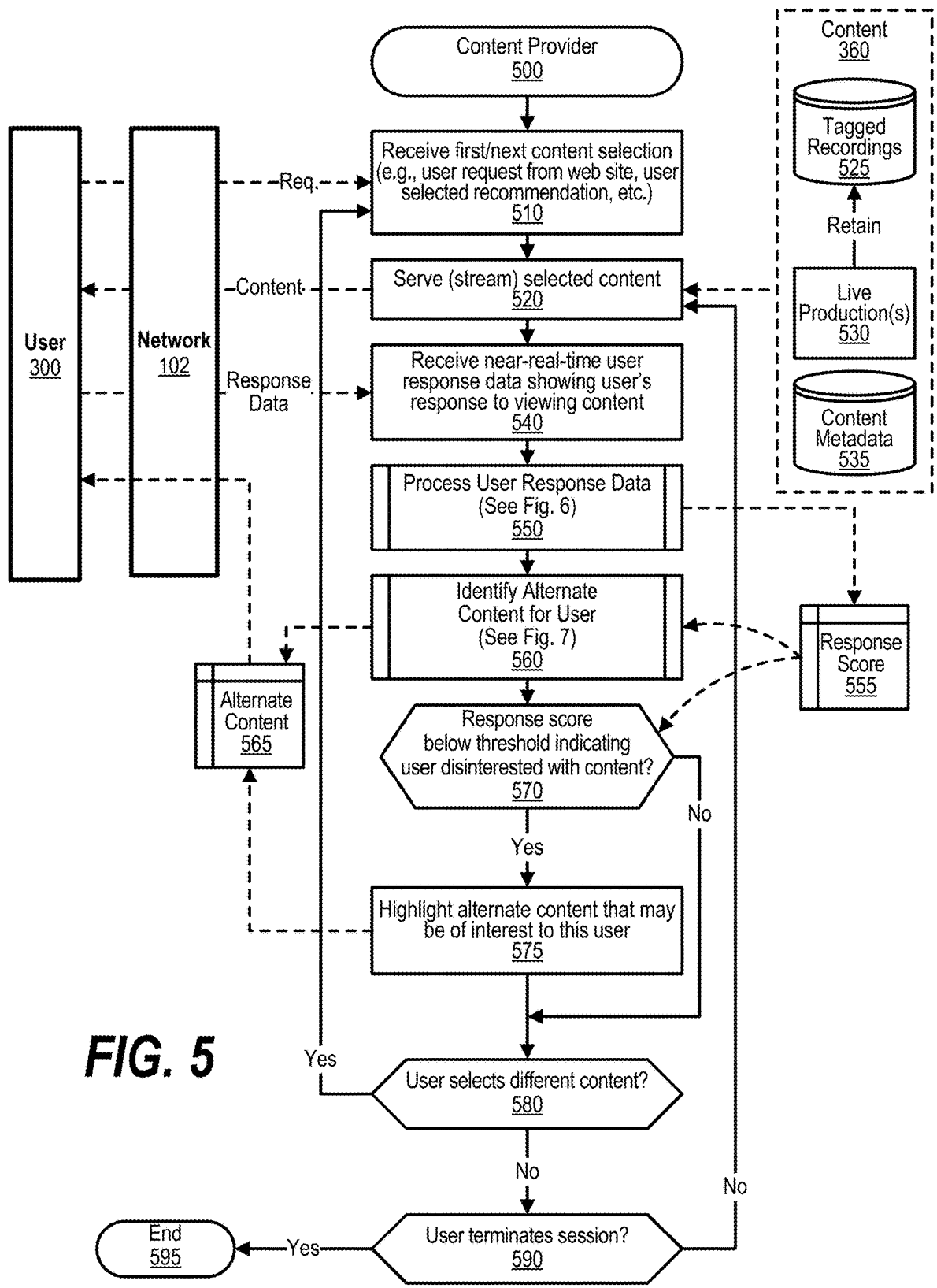
FIG. 5 is a depiction of a flowchart showing the logic performed by a content provider to provide a dynamic live feed recommendation to a user on the basis of the user's real-time reaction to a live feed content.

FIG. 5 is a depiction of a flowchart showing the logic performed by a content provider to provide a dynamic live feed recommendation to a user on the basis of the user's real-time reaction to a live feed content. FIG. 5 processing commences at 500 and shows the steps taken by a process that is performed by the content provider. At step 510, the process running at the content provider's system receives the first content selection (e.g., user request from web site, user selected recommendation, etc.) from user 300 sent over computer network 102, such as the Internet.

At step 520, the process running at the content provider's system serves (e.g., streams, etc.) the selected content by transmitting the content to user 300 via computer network 102. Content 360 is served in form of live production 530 and tagged pre-recorded content 525. Both the live productions and the pre-recorded content have content metadata 535 corresponding to various segments of content found within the respective content choices.

At step 540, the process running at the content provider's system receives near-real-time user multimedia response data showing the user's response to viewing the content being transmitted by the content provider. At predefined process 550, the process running at the content provider's system performs the Process User Response Data routine (see FIG. 6 and corresponding text for processing details).

Predefined process 550 stores the user's multimedia response score in memory area 555. At predefined process 560, the process running at the content provider's system performs the Identify Alternate Content for User routine (see FIG. 7 and corresponding text for processing details). This routine receives the response score and content metadata information and outputs a list of one or more alternative content options (list of alternative content) that are stored in memory area 565.

The process running at the content provider's system determines as to whether the response score is below a given threshold indicating that the user's engagement level low and that the user is disinterested with the content that is being streamed (decision 570). If the user's engagement level is below the threshold indicating that the user is disinterested with content, then decision 570 branches to the 'yes' branch whereupon at step 575, the process highlights alternate content that may be of interest to this user. On the other hand, if the response score does not indicate that the user's engagement level has fallen below the threshold, then decision 570 branches to 'no' branch bypassing step 575.

The process running at the content provider's system determines as to whether the user has selected a different content option from the list of alternative content options provided by the content provider (decision 580). If the user has selected a different content option, then decision 580 branches to the 'yes' branch which loops back to step 510 to retrieve and stream the next selected content as described above. On the other hand, if the user has not selected a different content option, then decision 580 branches to the 'no' branch exiting the loop.

The process running at the content provider's system determines as to whether the user has terminated the session with the content provider (decision 590). If the user has terminated the session with the content provider, then decision 590 branches to the 'yes' branch whereupon at 595, processing terminates. On the other hand, if the user has not terminated the session with the content provider, then decision 590 branches to the 'no' branch which keeps looping back to stream the selected content to the user's display device.

Figure 6:
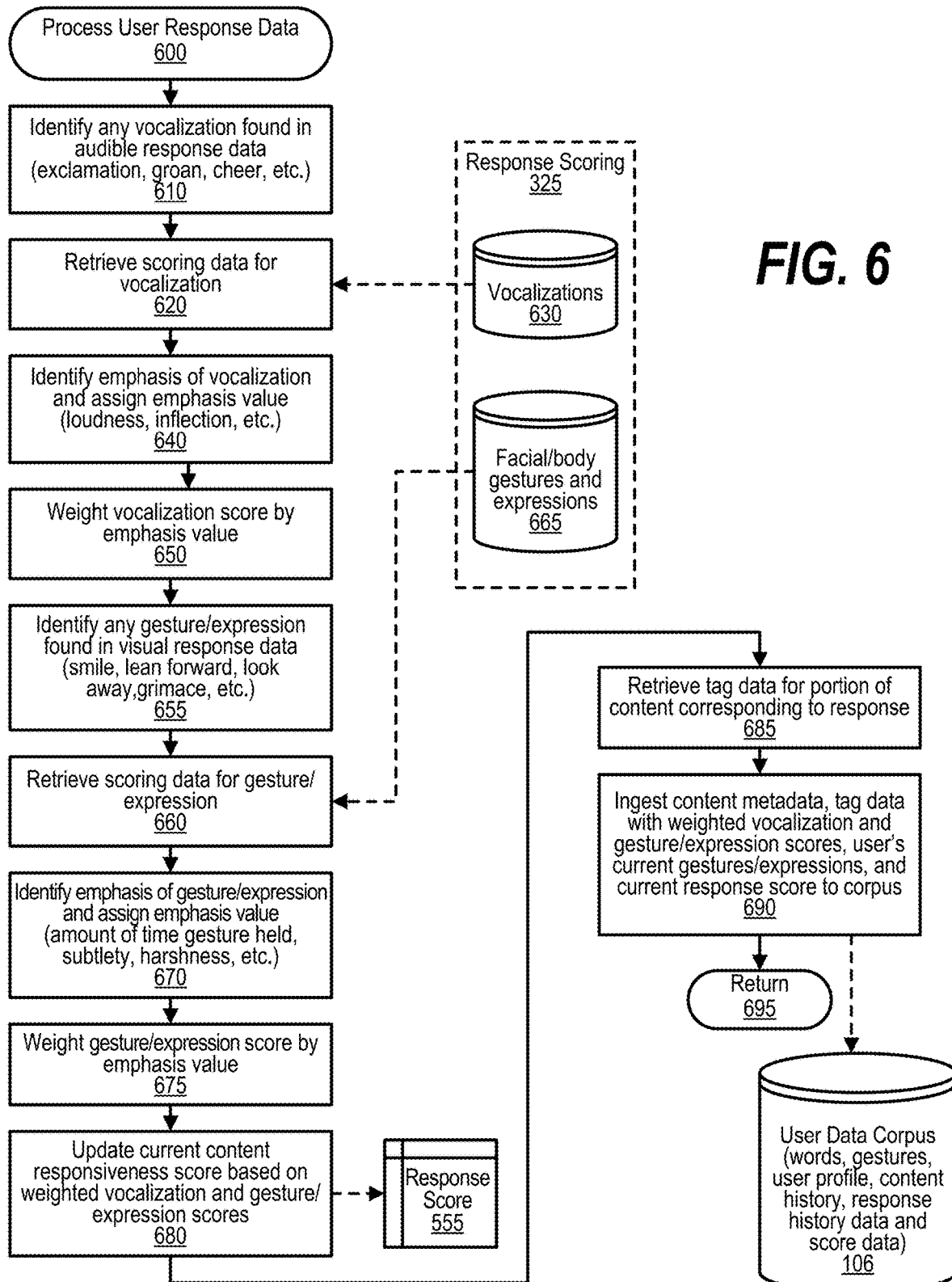
FIG. 6 is a depiction of a flowchart showing the logic performed by a content provider to process gathered real time user response data.

FIG. 6 is a depiction of a flowchart showing the logic performed by a content provider to process gathered real time user response data. FIG. 6 processing commences at 600 and shows the steps taken by a process that processes the user multimedia response data. At step 610, the process identifies any vocalization found in the audible portion of the multimedia response data received from the user's display device. Examples of vocalizations might include exclamations, groans, cheers, statements, and the like.

At step 620, the process retrieves scoring data for vocalization from data store 630. At step 640, the process identifies the level of emphasis corresponding to vocalizations found in the multimedia response data and assigns an emphasis value (e.g., based on loudness, inflection, etc.) to the vocalization. At step 650, the process weights the vocalization score by the emphasis value.

At step 655, the process identifies any non-verbal body language (e.g., gesture, expression, etc.) found in the visual response portion of the multimedia response data. Examples of non-verbal body language can include a smile, frown, the user leaning forward, the user looking away, a grimace, etc. At step 660, the process retrieves the scoring data for the identified non-verbal body language from data store 665. At step 670, the process identifies an emphasis of the non-verbal body language and assigns an emphasis value to the body language found in the multimedia response data. The emphasis can be based on the amount of time that a gesture is held, the subtlety or harshness of the body language, etc. At step 675, the process weights the non-verbal body language by the emphasis value.

At step 680, the process updates the current content responsiveness score that indicates the user's current degree of user engagement with the content with the responsiveness score being based on the weighted vocalization score and the weighted non-verbal body language score. The updated response score is stored in memory area 555.

At step 685, the process retrieves tag data for portion (segments) of content that correspond to the user's multimedia response data that was received by the content provider. At step 690, the process ingests the content metadata, tag data with weighted vocalization and non-verbal body language scores, the user's current non-verbal body language, and the user's current response score to corpus 106. FIG. 6 processing thereafter returns to the calling routine (see FIG. 5) at 695.

Figure 7:
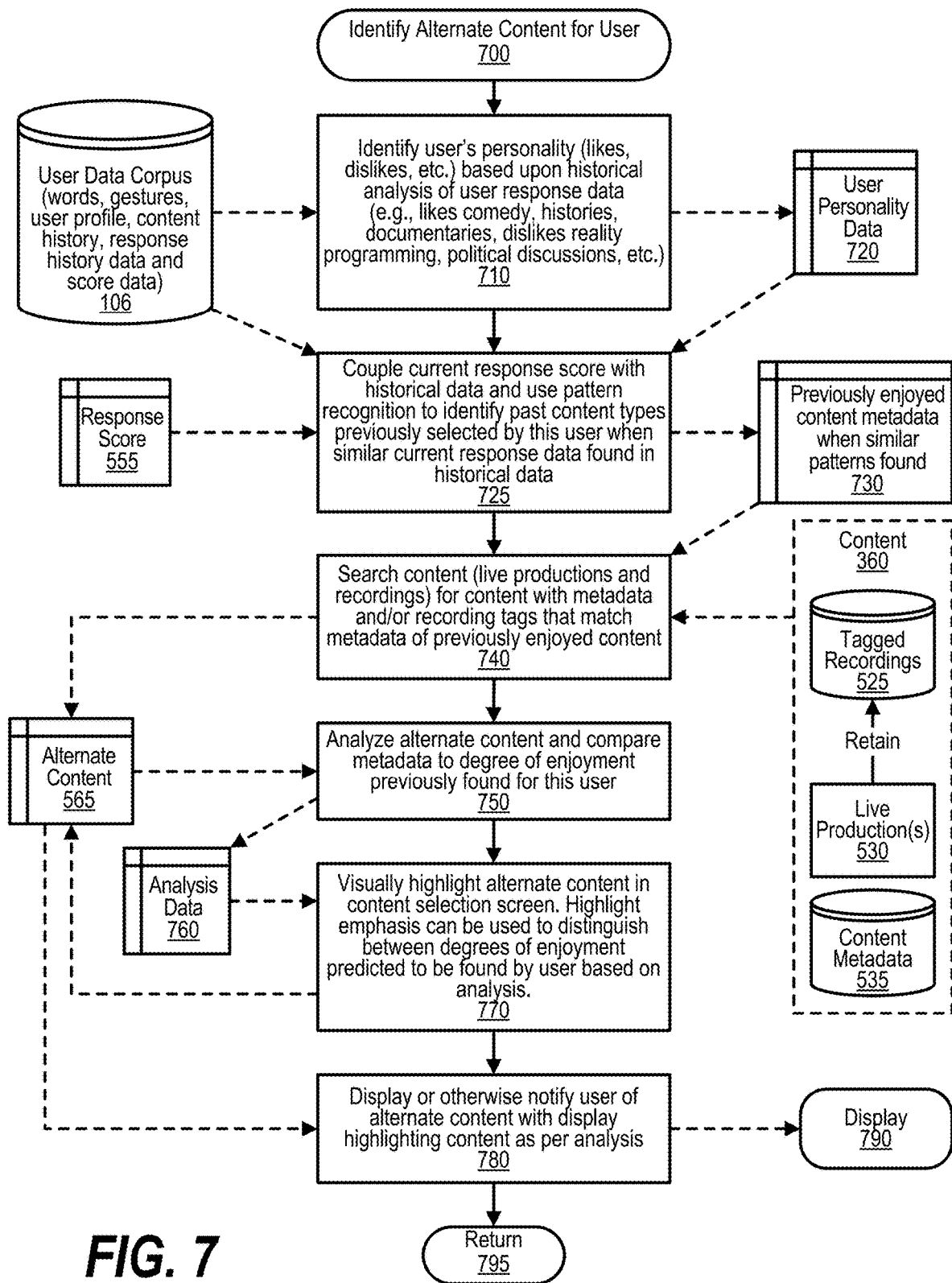
FIG. 7 is a depiction of a flowchart showing the logic performed by a content provider to identify alternate content to a user.

FIG. 7 is a depiction of a flowchart showing the logic performed by a content provider to identify alternate content to a user. FIG. 7 processing commences at 700 and shows the steps taken by a process that identifies alternate content for the user. At step 710, the process identifies the user's personality traits (e.g., likes, dislikes, etc.) based upon an historical analysis of the user response data (e.g., likes comedy, histories, documentaries, dislikes reality programming, political discussions, etc.). The historical data is retrieved from the user data corpus 106 and the resulting personality data is stored in memory area 720.

At step 725, the process couples the current response score from memory area 555 with the historical data from memory area 720 and uses pattern recognition to identify past content types that were previously selected or enjoyed by this user when similar current response data was found in the historical data. The resulting enjoyed content metadata when similar patterns were found is stored in memory area 730. In one embodiment, the process correlates past passive responses, such as facial expressions, as well as proactive responses, such as the user closing the app or selecting different other content, reactions in order to determine the particular threshold of discontent that is to be used for each user, with this embodiment recognizing that individual users utilize different methods to react to disliked content, with some of these users having reactions that are more expressive than others.

At step 740, the process searches content 360 (live productions and recordings) for content with metadata tags that match the metadata of previously enjoyed content that was stored in memory area 730. The identified alternate content is stored as a list of content options in memory area 565.

At step 750, the process analyzes the list of alternate content from memory area 565 and compares the metadata to the degree of enjoyment that was previously found for this user. The analysis data is stored in memory area 760.

At step 770, the process visually highlights the alternate content in the user's content selection screen which In one embodiment, is an area of the user's display screen that is proximate to the content that is currently being viewed. The highlights can emphasize some content alternatives in order to distinguish between degrees of enjoyment predicted to be found by user based on analysis. In one embodiment, the highlighting is performed with font size and colors. Additionally, the list of alternative content can be ordered so that those content options that best match are displayed first followed by content options with less of a match.

At step 780, the process transmits the alternative content options, with highlighting and ordering, to be displayed on the user's display device 790. FIG. 7 processing thereafter returns to the calling routine (see FIG. 5) at 795.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
  one or more processors;
  a memory coupled to at least one of the processors; and
  a set of computer program instructions stored in the memory and executed by at least one of the processors in order to perform actions comprising:
    transmitting a first video content to a user's display device to display the first video content on the user display device, wherein the content includes a plurality of segments, and wherein each of the segments corresponds to one or more metadata tags;

repeatedly receiving a plurality of multimedia response data from the user's display device, wherein the multimedia response data is related to audio and video captured of a user while the user watched a selected one or more of the plurality of content segments;

determining a degree of user engagement pertaining to each of the selected content segments, wherein the determining further comprises:
   identifying a type of vocalization corresponding to a vocalization found in the multimedia response data;
   retrieving a first scoring of the type of vocalization found in the multimedia response data;
   identifying a type of non-verbal language corresponding to a non-verbal language found in the multimedia response data;
   retrieving a second scoring of the type of non-verbal body language found in the multimedia response data;
   deriving a response score based on the first scoring and the second scoring; and
   determining the degree of user engagement based in part on the response score; and in response to the determined degree of user engagement falling below a user engagement threshold level:
   identifying one or more alternative content options, wherein the identified alternative content options are based on the determined degree of user engagement with at least one of the selected content segments; and
   transmitting the alternative content options to the user display device so that the alternative content options are displayed on the display device in an area proximate to displayed first video content.

2. The information handling system of claim 1 wherein the actions further comprise:
   receiving, from the user's display device, a selection of one of the alternative content options; and
   transmitting a second video content to the user display device and ceasing transmission of the first video content to the user display device.

3. The information handling system of claim 1 wherein identifying the alternative content options further comprises:
   retrieving a set of user personality traits corresponding to the user, wherein the user personality traits are based in part on a history of previous content watched by the user and the user's degree of engagement determined when the user watched the previous content;
   identifying one or more historical selections in the history of previous content where the user's multimedia response data was similar to the user's current multimedia response data;
   retrieving a set of metadata corresponding to the identified historical selections; and
   selecting the identified alternative content options based on a comparison of metadata corresponding to the identified alternative content being similar to the set of metadata corresponding to the identified historical selections.

4. The information handling system of claim 3 wherein the actions further comprise:
   highlighting the identified alternative content options based on a degree to which the metadata corresponding to the identified alternative content matched the set of metadata corresponding to the identified historical selections.

5. The information handling system of claim 1 wherein the actions further comprise:
   identifying a verbal emphasis of the vocalization exhibited by the user, wherein the scoring of the type of vocalization is modified based on the identified verbal emphasis; and
   identifying a non-verbal emphasis of the non-verbal body language exhibited by the user, wherein the scoring of the type of non-verbal body language is modified based on the identified non-verbal emphasis.

6. The information handling system of claim 1 wherein the first video content is a live-stream video content and wherein the alternative content options are selected from a group consisting of live-stream video content and pre-recorded video content.

7. A computer program product stored in a non-transitory computer readable storage medium, comprising computer program code that, when executed by an information handling system, performs actions comprising:
   transmitting a first video content to a user's display device to display the first video content on the user display device, wherein the content includes a plurality of segments, and wherein each of the segments corresponds to one or more metadata tags;
   repeatedly receiving a plurality of multimedia response data from the user's display device, wherein the multimedia response data is related to audio and video captured of a user while the user watched a selected one or more of the plurality of content segments;
   determining a degree of user engagement pertaining to each of the selected content segments, wherein the determining further comprises:
      identifying a type of vocalization corresponding to a vocalization found in the multimedia response data;
      retrieving a first scoring of the type of vocalization found in the multimedia response data;
      identifying a type of non-verbal language corresponding to a non-verbal language found in the multimedia response data;
      retrieving a second scoring of the type of non-verbal body language found in the multimedia response data;
      deriving a response score based on the first scoring and the second scoring; and
      determining the degree of user engagement based in part on the response score; and
   in response to the determined degree of user engagement falling below a user engagement threshold level:
      identifying one or more alternative content options, wherein the identified alternative content options are based on the determined degree of user engagement with at least one of the selected content segments; and
      transmitting the alternative content options to the user display device so that the alternative content options are displayed on the display device in an area proximate to displayed first video content.

8. The computer program product of claim 7 wherein the actions further comprise:
   receiving, from the user's display device, a selection of one of the alternative content options; and
   transmitting a second video content to the user display device and ceasing transmission of the first video content to the user display device.

9. The computer program product of claim 7 wherein identifying the alternative content options further comprises:
retrieving a set of user personality traits corresponding to the user, wherein the user personality traits are based in part on a history of previous content watched by the user and the user's degree of engagement determined when the user watched the previous content;
identifying one or more historical selections in the history of previous content where the user's multimedia response data was similar to the user's current multimedia response data;
retrieving a set of metadata corresponding to the identified historical selections; and
selecting the identified alternative content options based on a comparison of metadata corresponding to the identified alternative content being similar to the set of metadata corresponding to the identified historical selections.

10. The computer program product of claim 9 wherein the actions further comprise:
highlighting the identified alternative content options based on a degree to which the metadata corresponding to the identified alternative content matched the set of metadata corresponding to the identified historical selections.

11. The computer program product of claim 7 wherein the actions further comprise:
identifying a verbal emphasis of the vocalization exhibited by the user, wherein the scoring of the type of vocalization is modified based on the identified verbal emphasis; and
identifying a non-verbal emphasis of the non-verbal body language exhibited by the user, wherein the scoring of the type of non-verbal body language is modified based on the identified non-verbal emphasis.

* * * * *